(12) United States Patent  
Suto

(10) Patent No.: US 7,652,694 B2  
(45) Date of Patent: Jan. 26, 2010

(54) IMAGE PICK-UP APPARATUS

(75) Inventor: Kazutoshi Suto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 703 days.

(21) Appl. No.: 10/995,225

(22) Filed: Nov. 24, 2004

(65) Prior Publication Data

US 2005/0117044 A1    Jun. 2, 2005

(30) Foreign Application Priority Data

Nov. 27, 2003 (JP) ............................ 2003-397915  
Oct. 1, 2004 (JP) ............................ 2004-289830

(51) Int. Cl.
*H04N 5/262* (2006.01)
*H04N 5/76* (2006.01)
*H04N 5/222* (2006.01)

(52) U.S. Cl. ............... 348/239; 348/231.2; 348/333.12

(58) Field of Classification Search ................ 348/239, 348/333.12, 552

See application file for complete search history.

(56) References Cited

U.S. PATENT DOCUMENTS

| | | | | | |
|---|---|---|---|---|---|
| 4,471,382 | A | * | 9/1984 | Toyoda et al. | ................ 348/239 |
| 4,591,897 | A | * | 5/1986 | Edelson | ....................... 348/589 |
| 4,613,906 | A | * | 9/1986 | Tanaka et al. | ................ 348/239 |
| 5,257,074 | A | * | 10/1993 | Kamei | ......................... 382/187 |
| 5,434,929 | A | * | 7/1995 | Beernink et al. | ............ 382/187 |
| 5,671,014 | A | * | 9/1997 | Ito et al. | ....................... 348/239 |
| 5,828,783 | A | * | 10/1998 | Ishigaki | ....................... 382/186 |
| 6,188,432 | B1 | * | 2/2001 | Ejima | ..................... 348/240.99 |
| 6,195,513 | B1 | * | 2/2001 | Nihei et al. | ................. 396/332 |
| 6,272,243 | B1 | * | 8/2001 | Ulgen et al. | ................. 382/187 |
| 6,369,908 | B1 | * | 4/2002 | Frey et al. | ................... 358/1.15 |
| 6,556,243 | B1 | * | 4/2003 | Dotsubo et al. | .......... 348/231.2 |
| 6,814,298 | B2 | * | 11/2004 | Matsushita et al. | .......... 235/494 |
| 6,900,912 | B1 | * | 5/2005 | Miyake | ....................... 358/474 |
| 2001/0025303 | A1 | * | 9/2001 | Fisher et al. | ................ 709/217 |
| 2002/0001036 | A1 | * | 1/2002 | Kinjo | .......................... 348/231 |
| 2002/0008763 | A1 | | 1/2002 | Kawamura et al. | |
| 2002/0018138 | A1 | * | 2/2002 | Yoshiro | ................. 348/333.05 |

(Continued)

FOREIGN PATENT DOCUMENTS

JP     5-161049 A     6/1993

(Continued)

*Primary Examiner*—Sinh Tran  
*Assistant Examiner*—Wanda M Negron  
(74) *Attorney, Agent, or Firm*—Birch, Stewart, Kolasch & Birch, LLP.

(57) ABSTRACT

An image pick-up apparatus loaded in a body of the apparatus with a monitor for displaying a captured image is provided. The image pick-apparatus includes an input device which inputs a character and an image to be combined with an image displayed on the monitor, a composition device which combines the character and the image input through the input device with the image displayed on the monitor, and generates a composite image, an instruction device which instructs a record of the composite image generated by the composition device, and a record control device which records a composite image generated by the composition device in accordance with an instruction of the instruction device in a record medium, and adds an identification symbol for identifying that the image recorded in the record medium is a composite image to a part of a file name, thereby recording data in the record medium.

7 Claims, 12 Drawing Sheets

U.S. PATENT DOCUMENTS

2006/0017823 A1 * 1/2006 Kuroiwa ................ 348/231.99
2006/0038897 A1 * 2/2006 Sakimura et al. ......... 348/231.6

FOREIGN PATENT DOCUMENTS

| JP | 9-149307 A | 6/1997 |
| JP | 11-4403 A | 1/1999 |
| JP | 11-289484 A | 10/1999 |
| JP | 2000-200143 A | 7/2000 |
| JP | 2001-21983 A | 1/2001 |
| JP | 2001021983 A * | 1/2001 |
| JP | 2002-16828 A | 1/2002 |
| JP | 2002-176615 A | 6/2002 |
| JP | 2002-204347 A | 7/2002 |
| JP | 2002-300513 A | 10/2002 |
| JP | 2003-242150 A | 8/2003 |

* cited by examiner

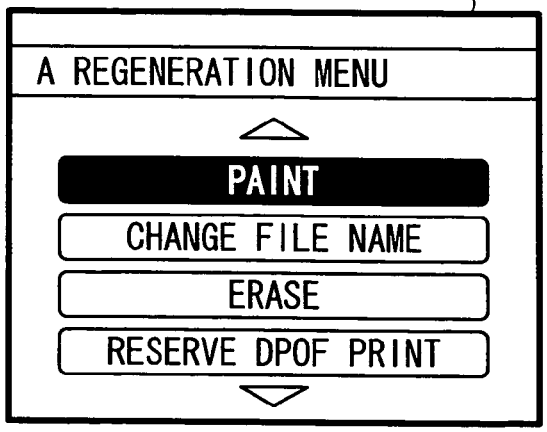
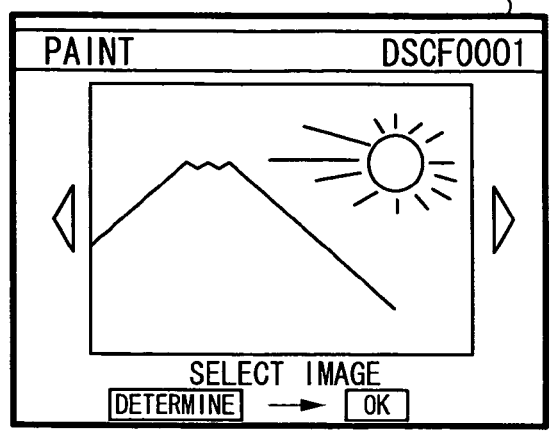
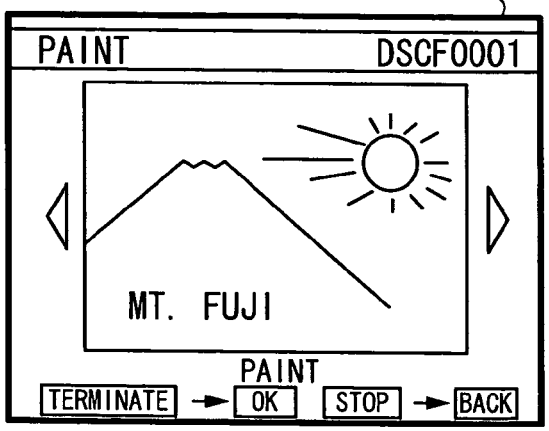
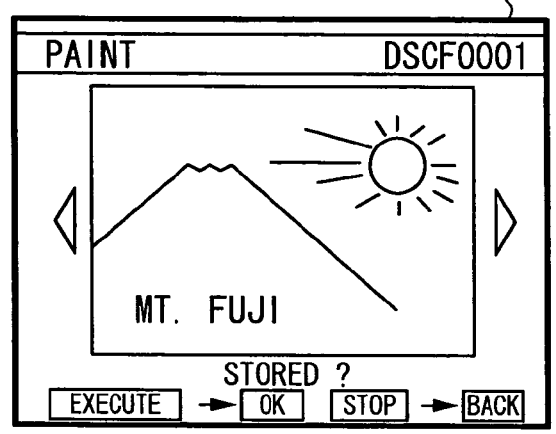
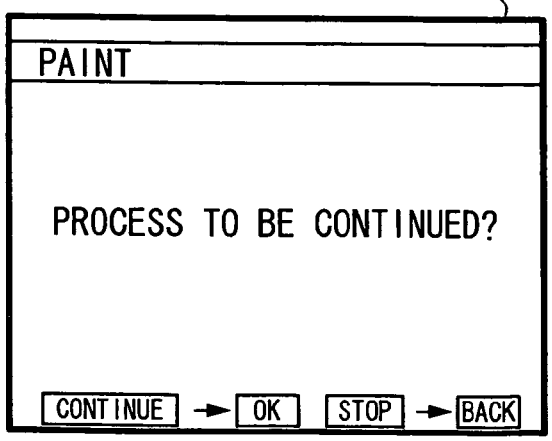

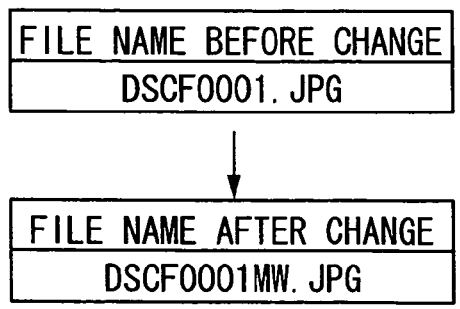

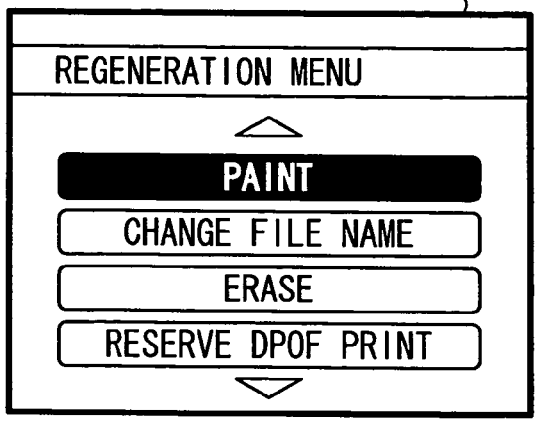
FIG.11A
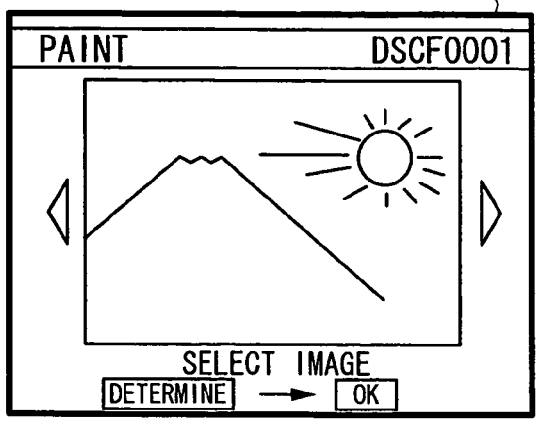
FIG.11B
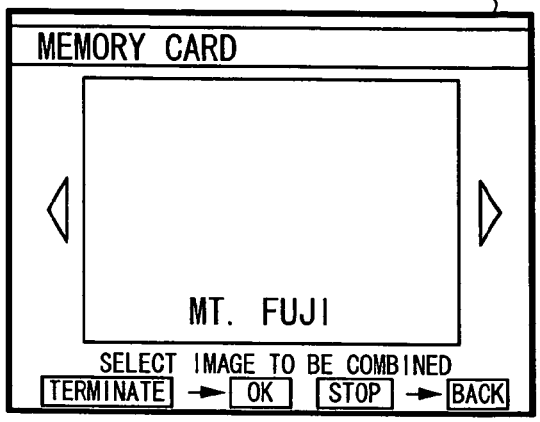
FIG.11C
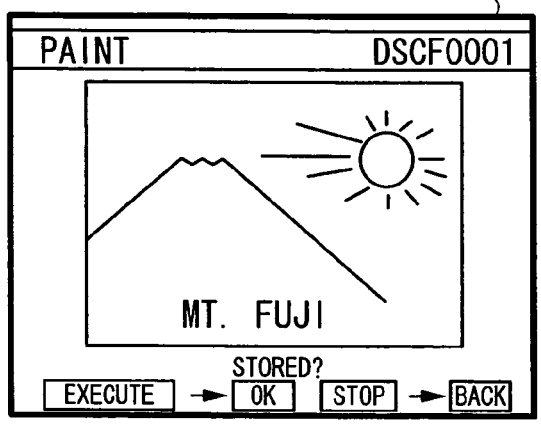
FIG.11D
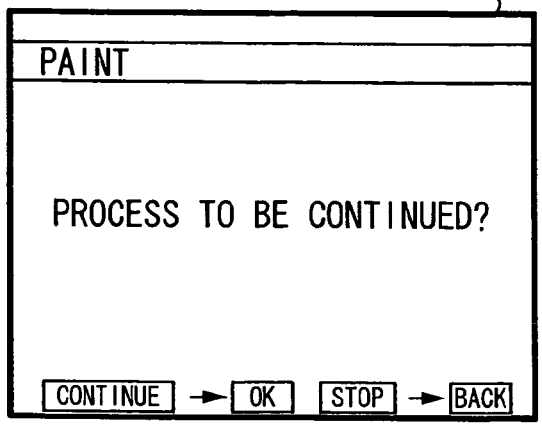
FIG.11E
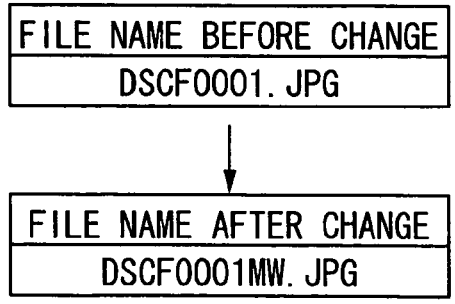

FIG.12A

A SELECT FILE NAME
- NUMERIC
- ALPHABETIC
- KANA
- KANJI
- DATE
- NAME OF PERSON
- NAME OF AREA

FIG.12B

INPUT NUMERIC

| 0 | 1 | 2 | 3 | 4 | 5 | 6 | 7 | 8 | 9 |

200405_

DETERMINE → OK    TERMINATE → BACK

FIG.12C

INPUT ALPHABET

| a | b | c | d | e | f | g | h | i | j |
| k | l | m | n | o | p | q | r | s | t |
| u | v | w | x | y | z | _ | - | + | / | abcdef_

DETERMINE → OK    TERMINATE → BACK

FIG.12D

INPUT AREA NAME

| METROPOLIS/PREFECTURE | TOKYO |
| CITY/TOWN/VILLAGE | SHINJUKU |

SHINJUKU, TOKYO

DETERMINE → OK    TERMINATE → BACK

IMAGE PICK-UP APPARATUS

BACKGROUND OF THE INVENTION

1. Field of the Invention

The present invention relates to an image pick-up apparatus, and more specifically to an image pick-up apparatus having a touch panel capable of accepting a pen-input character on a monitor screen.

2. Description of the Related Art

Generally, the body of an electronic camera is provided with a monitor, and the captured image can be displayed on the monitor.

An electronic camera has been proposed with a touch panel provided for the monitor of the electronic camera so that a menu screen can be operated and a memo can be input to the captured image (for example, Japanese Patent Application Publication No. 9-149307, Japanese Patent Application Publication No. 5-161049, Japanese Patent Application Publication No. 2001-21983, Japanese Patent Application Publication No. 11-289484).

By using the monitor and the operation button of the electronic camera, character can be input and a comment can be added to a captured image (for example, Japanese Patent Application Publication No. 2002-300513).

SUMMARY OF THE INVENTION

Normally, since a file name is automatically assigned to an image captured by an electronic camera and recorded in a record medium (for example, a combination of an alphabetical character and a serial number, etc.), the contents of the image cannot be anticipated from a file name, and it is hard to manage a recorded image.

The problem also arises in the electronic camera provided with a character input device such as the touch panel, etc. and it is hard to manage a recorded image.

The present invention has been developed to solve the above-mentioned problem, and aims at providing an image pick-up apparatus capable of easily managing a captured image.

To attain the advantage of the invention, the first aspect of the present invention provides an image pick-up apparatus loaded in a body of the apparatus with a monitor for displaying a captured image, including: an input device which inputs a character and an image to be combined with an image displayed on the monitor; a composition device which combines the character and the image input through the input device with the image displayed on the monitor, and generates a composite image; an instruction device which instructs a record of the composite image generated by the composition device; and a record control device which records a composite image generated by the composition device in accordance with an instruction of the instruction device in a record medium, and adds an identification symbol for identifying that the image recorded in the record medium is a composite image to a part of a file name, thereby recording data in the record medium.

According to the first aspect, a character (including a symbol) and an image (including graphics) input from an input device can be combined with an image displayed on the monitor. The composite image can be recorded on the record medium. At this time, an identification symbol indicating that the image is a composite image is added to the file name of the composite image recorded on the record medium (for example, W is added to the end of the file name). Thus, when the image recorded on the record medium is a composite image, it is immediately determined from the file name, thereby facilitating the management of an image.

To attain the advantage of the invention in the second aspect of the present invention based on the first aspect, the record control device records data in the record medium by adding an identification symbol for identifying that the image recorded in the record medium is a composite image and an identification symbol for identification of an input source of a combined character to a part of a file name.

The second aspect of the present invention provides an image pick-up apparatus in which an identification symbol indicating that the image recorded on a record medium is a composite image, a composed character, and an identification symbol for identification of an input source of the image are added to a part of a file name, and a composite image is stored in a storage medium. Thus, that the image stored in the storage medium is a composite image and the input source of composite data can be immediately determined from the file name, thereby facilitating the management of an image.

To attain the advantage of the present invention in the third aspect of the present invention based on the first or second aspect, the input device is mounted on a screen of the monitor, and comprises a touch panel capable of accepting pen-input characters and images.

The third aspect of the present invention provides an image pick-up apparatus in which the input device is configured by a touch panel. Thus, a character and an image can be easily written to an image displayed on the monitor.

To attain the advantage of the present invention in the fourth aspect of the present invention based on the third aspect, the image-pickup apparatus further comprises: a character data storage device which stores prescribed character data; and a character recognition device which recognizes a pen-input character from the touch panel based on character data stored in the character data storage device, wherein the composition device combines a character of character data recognized by the character recognition device with an image displayed on the monitor.

The fourth aspect provides an image pick-up apparatus in which a pen-input character on the touch panel can be identified based on prescribed character data, and the character of the identified character data can be combined with the image displayed on the monitor.

To attain the advantage of the present invention in the fifth aspect of the present invention, based on the fourth aspect, prescribed character data stored in the character data storage device is numeric character data.

The fifth aspect of the present invention provides an image pick-up apparatus in which the character data storage device stores numeric character data Thus, a pen-input numeric character on a touch panel can be recognized.

To attain the advantage of the sixth aspect of the present invention based on the fourth aspect, prescribed character data stored in the character data storage device is alphabetic character data.

The sixth aspect of the present invention provides an image pick-up apparatus in which the character data storage device stores alphabetic character data. Thus, a pen-input alphabetic character on a touch panel can be recognized.

To attain the advantage of the seventh aspect of the present invention based on the fourth aspect, prescribed character data stored in the character data storage device is kana-kanji character data.

The seventh aspect of the present invention provides an image pick-up apparatus in which the character data storage device stores kana-kanji character data. Thus, a pen-input kana-kanji character on the touch panel can be recognized.

To attain the advantage of the eighth aspect of the present invention based on the fourth aspect, prescribed character data stored in the character data storage device is numeric, alphabetic, and kana-kanji character data; and the apparatus further comprises a character type selection device which selects a character type recognized by the character recognition device.

The eighth aspect of the present invention provides an image pick-up apparatus in which the character data storage device stores numeric, alphabetic, and kana-kanji character data, thereby selecting the character type for use in recognition. Thus, by limiting the type of character to be used in recognition, a character can be easily recognized, thereby quickly and correctly recognizing a character input on the touch panel.

To attain the advantage of the ninth aspect of the present invention based on the fourth to eighth aspects, the character data storage device is attachable to and removable from the body of the apparatus.

According to the ninth aspect of the present invention, the character data storage device can be attached to and removable from the body of the apparatus. Thus, as necessary, various character data can be stored and used instead in the character data storage device.

To attain the advantage of the present invention, the tenth aspect of the present invention based on the first or second aspect provides an image pick-up apparatus in which the input device comprises: a composite data storage device which stores prescribed character and image data; a display control device which reads a character and an image stored in the composite data storage device and displays the character and the image on the monitor; and a selection device which selects a character and an image displayed on the monitor, wherein the selection device selects and inputs the character and the image displayed on the monitor.

According to the tenth aspect of the present invention, a character and an image stored in the character data storage device are read on the monitor, and the character and the image displayed on the monitor are selected by the selection device and input for use in composition.

To attain the advantage of the present invention, the eleventh aspect of the present invention based on the tenth aspect provides an image pick-up apparatus in which the composite data storage device is attachable to and removable from the body of the apparatus.

According to the eleventh aspect of the present invention, the character data storage device is attached to and removable from the body of the apparatus. Thus, as necessary, various character data can be stored and used instead in the character data storage device.

To attain the advantage of the present invention, the twelfth aspect of the present invention according to the first or second aspect provides an image pick-up apparatus in which the input device is externally connected to the body of the apparatus.

According to the twelfth aspect of the present invention, the input device is externally connected to the body of the apparatus. That is, the input device is configured by external equipment such as a keyboard, a mouse, a PC, a digital camera, a scanner, etc.

To attain the advantage of the present invention, the thirteenth aspect of the present invention provides an image pick-up apparatus having a monitor for displaying the taken image, in which an instruction device which instructs a change of a file name of an image displayed on the monitor; an input device which inputs a file name of an image displayed on the monitor in accordance with an instruction of the instruction device; and a file name rewrite device which rewrites all or a part of a file name of an image displayed on the monitor into a file name input by the input device in accordance with an instruction of the instruction device.

According to the thirteenth aspect of the present invention, all or a part of the file name of the image displayed on the monitor can be rewritten to a file name input from an input device. Thus, images can be easily managed by file name.

To attain the advantage of the present invention, the fourteenth aspect of the present invention based on the thirteenth aspect provides an image pick-up apparatus in which the input device comprises: a touch panel which is mounted on a screen of the monitor, and is capable of accepting a pen-input character; a character data storage device which stores prescribed character data; and a character recognition device which recognizes a pen-input character from the touch panel based on character data stored in the character data storage device, wherein the file name rewrite device rewrites all or a part of a file name of an image displayed on the monitor into a character recognized by the character recognition device.

According to the fourteenth aspect of the present invention, a file name can be changed by inputting a pen-input character from a touch panel. That is, when a pen-input character is input on a touch panel, the character is recognized by a character recognition device based on the character data stored in the character data storage device. The character recognized by the character recognition device is used for all or a part of a file name. Thus, a file name can be easily and quickly changed.

To attain the advantage of the present invention, the fifteenth aspect of the present invention based on the fourteenth aspect provides an image pick-up apparatus in which prescribed character data stored in the character data storage device is numeric character data.

According to the fifteen aspect of the present invention, the character data storage device stores numeric character data. Thus, a numeric character can be pen-input on the touch panel for recognition.

To attain the advantage of the present invention, the sixteenth aspect of the invention based on the fourteenth aspect provides an image pick-up apparatus in which prescribed character data stored in the character data storage device is alphabetic character data.

According to the sixteenth aspect, alphabetic character data is stored in the character data storage device. Thus, an alphabetic character can be pen-input on the touch panel for recognition.

To attain the advantage of the present invention, the seventeenth aspect of the present invention based on the fourteenth aspect provides an image pick-up apparatus in which prescribed character data stored in the character data storage device is kana-kanji character data.

According to the seventeenth aspect of the present invention, the character data storage device stores kana-kanji character data. Thus, a kana-kanji character can be pen-input on the touch panel for recognition To attain the advantage of the present invention, the eighteenth aspect of the present invention based on the fourteenth aspect provides an image pick-up apparatus in which prescribed character data stored in the character data storage device is numeric, alphabetic, and kana-kanji character data; and the apparatus further comprises a character type selection device which selects a character type recognized by the character recognition device.

According to the eighteenth aspect of the present invention, the character data storage device stores numeric, alphabetic, and kana-kanji characters thereby selecting the character type for use in recognition. Thus, a character can be correctly and quickly recognized although a number of recognizable characters are provided.

To attain the advantage of the present invention, the nineteenth aspect of the present invention based on the fourteenth to eighteenth aspects provides an image pick-up apparatus in which the character data storage device is attachable to and removable from the body of the apparatus.

According to the nineteenth aspect of the present invention, the character data storage device can be attached to and removable from the body of the apparatus. Thus, as necessary, various character data can be stored and used instead in the character data storage device.

To attain the advantage of the present invention, the twentieth aspect of the present invention based on the thirteenth aspect provides an image pick-up apparatus in which the input device is externally connected to the body of the apparatus.

According to the twentieth aspect of the present invention, the input device can be configured by an external apparatus such as a keyboard, etc.

According to the image pick-up apparatus according to the present invention, an image can be easily managed.

BRIEF DESCRIPTION OF THE DRAWINGS

FIGS. 5A to 5E show examples of displaying a monitor in a paint mode;

FIGS. 11A to 11E show examples of displaying a monitor when a template is composed; and FIGS. 12A to 12D show examples of displaying a monitor when a file name is selected.

DETAILED DESCRIPTION OF THE PREFERRED EMBODIMENTS

The best mode for embodying the image pick-up apparatus according to the present invention is described below by referring to the attached drawings.

Figure 1:
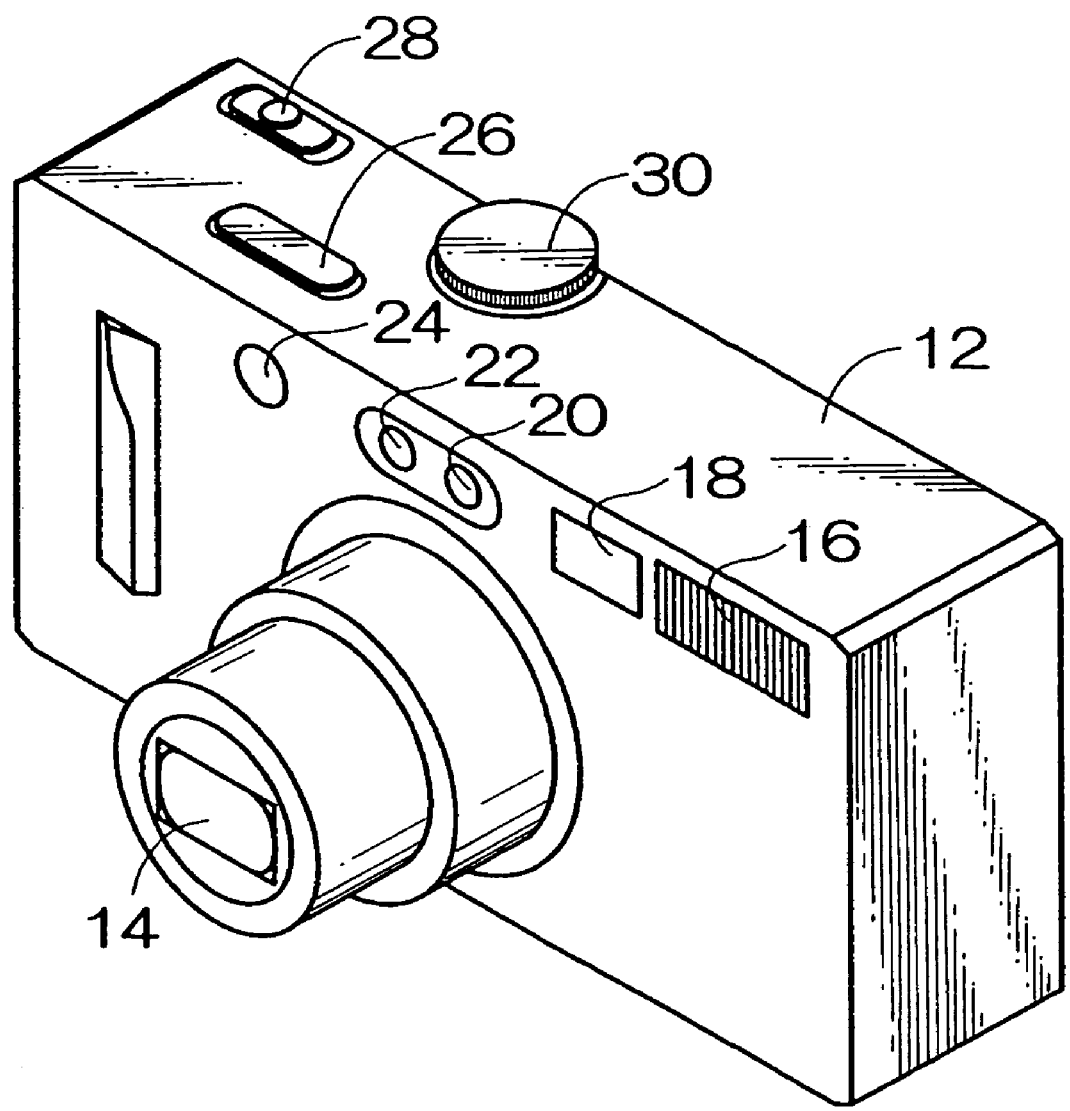
FIG. 1 is an elevational perspective view of an electronic camera to which the present invention is applied.
Figure 2:
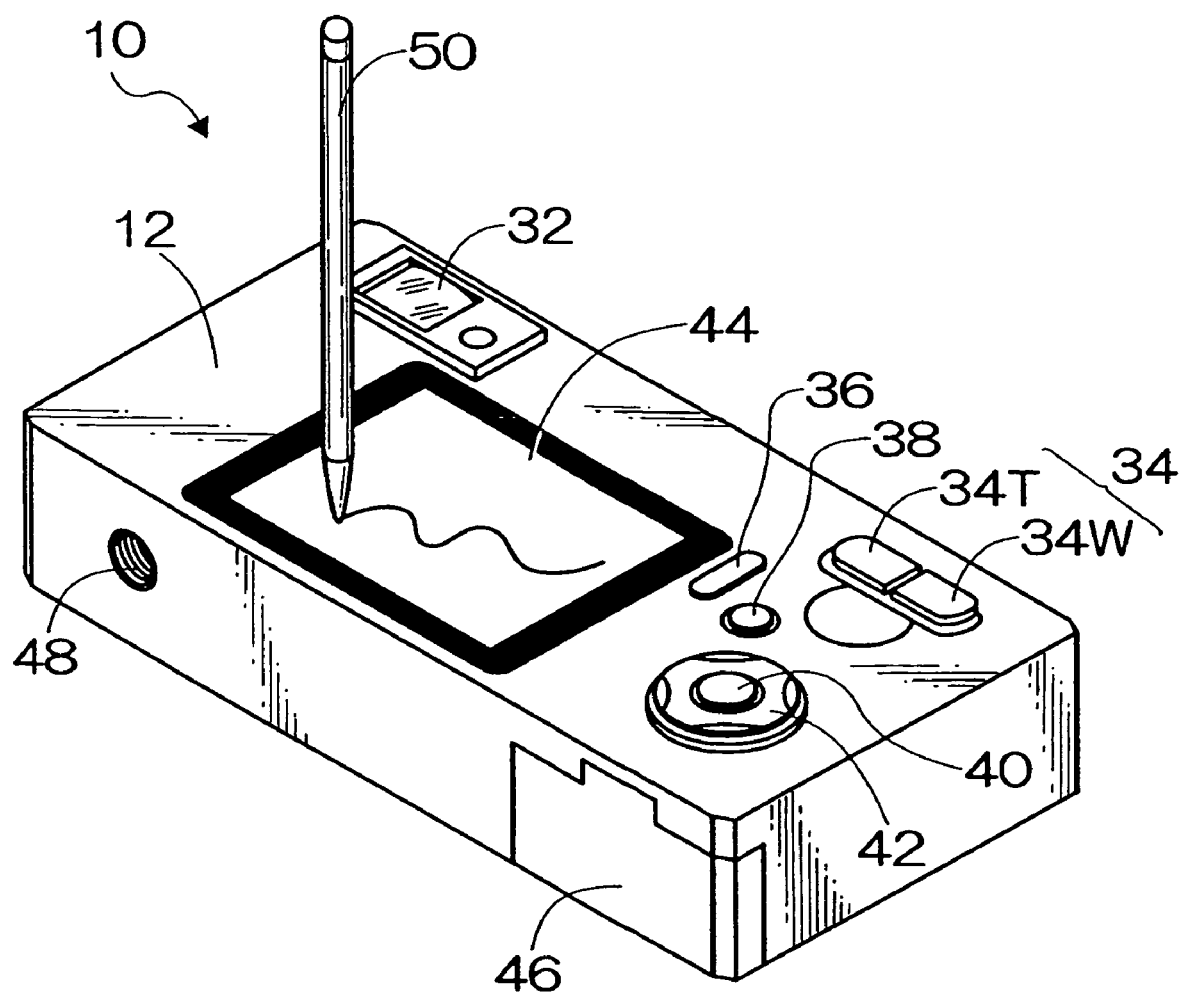
FIG. 2 is a rear elevational perspective view of an electronic camera to which the present invention is applied.

FIGS. 1 and 2 are respectively an elevational perspective view and a rear perspective view showing an embodiment of an image-pickup apparatus according to the present invention.

The image pick-up apparatus shown in FIGS. 1 and 2 is an electronic camera 10 having the function of recording and regenerating a still image. As shown in FIG. 1, a lens 14, a strobe 16, a finder window 18, an AF auxiliary light lamp 20, a self-timer lamp 22, a strobe dimmer sensor 24, etc. are provided on the front side of the apparatus, and a shutter button 26, a power supply switch 28, a mode dial 30, etc. are provided on the top surface.

As shown in FIG. 2, a finder eyepiece 32, a zoom button 34, a display button 36, a menu/OK button 38, a BACK button 40, a cross button 42, a display unit 44, etc. are provided at the rear of the camera body 12. A battery cover 46, a hole for a three-legged stand 48, etc. is provided on the bottom surface.

The shutter button 26 is configured by a 2-stage stroke switch, that is, a half-press and full-press switch. A half-press of the shutter button 26 operates the AE/AF, and a full-press takes a picture.

The power supply switch 28 also functions as a mode switch, and can be slid among the "OFF position", "regeneration position", and "capture position". By sliding the 28 from the "OFF position" to the "regeneration position", the electronic camera 10 is powered up in the regeneration mode, and is powered up in the capture mode by sliding it to the "capture position".

The mode dial 30 is an operation dial for switch of capture modes. By setting the position of the mode dial 30, the electronic camera 10 can be set in the "auto-capture mode", "programmed capture mode", "shutter speed precedence capture mode", "diaphragm precedence capture mode", "manual capture mode", "portrait capture mode", "landscape capture mode", "sports capture mode", "night piece mode", or "animation capture mode".

The zoom button 34 comprises a zoom telebutton 34T and a zoom wide button 34W, functions as a button indicating the zoom of an image when the capturing and regenerating operations are performed. The display button 36 functions as a button indicating the switch of the contents displayed on the display unit 44.

The menu/OK button 38 functions as a button (menu button) indicating the transition from the normal screen to the menu screen of each mode, and also functions as a button (OK button) indicating the determination and execution of the selected contents. The BACK button 40 functions as the button indicating the cancellation, etc. of an inputting operation.

The cross button 42 functions as a button for input of the indication of the four directions, that is, up, down, left, and right directions, and is used in selecting a menu item on the menu screen. When an image is taken, the right key functions as a strobe button, and the left key functions as a macro button. That is, by pressing the right key of the cross button 42 during the capturing operation, the macro function is turned on/off, and by pressing the left key, the strobe mode is switched to the "automated", "red-eye preventing light", "illumination prohibited", "slow synchronization".

The display unit 44 comprises a monitor 44A and a touch panel 44B arranged on the monitor 44A.

The monitor 44A is configured by a liquid crystal display for color display, and is used as a display screen of recorded image, and also used as the display screen of a user Internet. During the capturing operation, it is also used as an electronic finder for confirmation of angle of view.

The touch panel 44B is arranged to cover the monitor 44A, and detects the point of a press by a pen 50. Since the touch panel is a well-known technology, the detailed explanation of its configuration is omitted here.

The battery cover 46 is provided on the bottom surface of the camera body 12 such that it can be opened and closed. Inside the cover, a battery attachment unit not shown in the attached drawings and a memory card slot are provided. The battery used as a power supply for an electronic camera is attached to and removable from the battery attachment unit inside the battery cover 46. A memory card (record medium)

for recording image data is attached to and removable from the memory card slot provided inside the battery cover 46.

Figure 3:
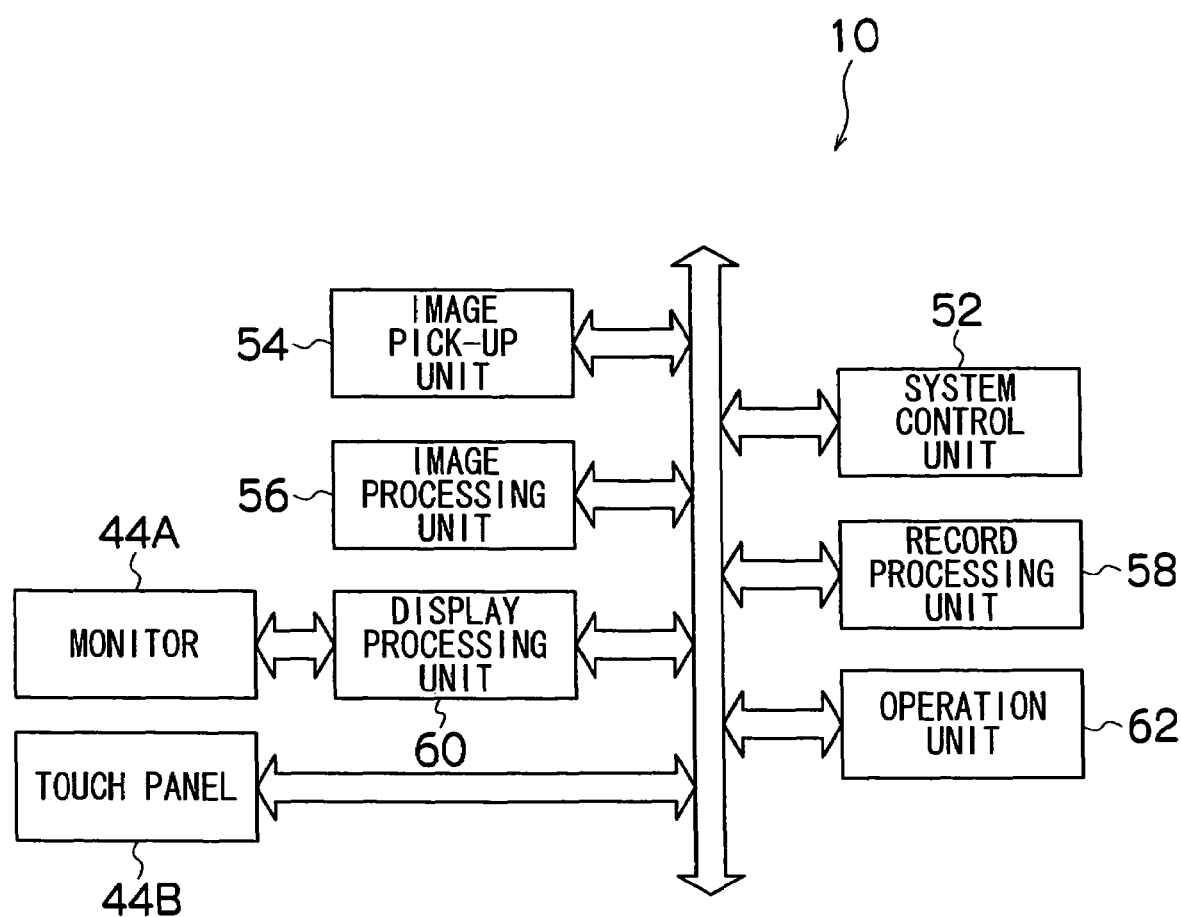
FIG. 3 is a block diagram of the internal configuration of an electronic camera to which the present invention is applied.

FIG. 3 is a block diagram of the internal configuration of the electronic camera 10. As shown in FIG. 10, the electronic camera 10 mainly comprises a system control unit 52, an image pick-up unit 54, an image processing unit 56, a record processing unit 58, a display processing unit 60, an operation unit (the shutter button 26, the power supply switch 28, the mode dial 30, the zoom button 34, the display button 36, the menu/OK button 38, the BACK button 40, the cross button 42, etc.) 62, etc.

The system control unit 52 comprises a CPU, ROM, RAM, etc., and controls the entire electronic camera based on the program recorded on the ROM at an operation signal from the operation unit 62.

The image pick-up unit 54 comprises a lens, a lens drive unit, a CCD, and a CCD drive circuit, an A/D converter, etc., and captures a subject at a command from the system control unit 52.

The image processing unit 56 performs various image processing according to an image signal obtained by the image pick-up unit 54, and is configured by a controller having the function of compressing and decompressing an image and memory, etc., and processes an image signal input according to a command from the system control unit 52.

The record processing unit 58 is configured by a media controller, memory card, etc., and records the image data processed by the image processing unit 56 in the memory card at a command from the system control unit 52.

The display processing unit 60 is configured by a D/A converter, an on-screen display controller, etc., performs signal processing to display an image signal processed by the image processing unit 56 on the monitor 44A, generates various graphic images for a user interface, and displays it on the monitor 44A.

The touch panel 44B detects the coordinates of the point pressed by the pen 50, and outputs detected coordinates to the system control unit 52. The system control unit 52 stores the coordinates locus data input from the touch panel 44B in the RAM, and recognizes the character (including a symbol) input based on the locus data. It then outputs the locus data to the image processing unit 56, and combines it with the input character, graphics, and an image regenerated in the monitor 44A.

As described above, the electronic camera 10 according to the present embodiment is provided with the touch panel 44B. The touch panel 44B adds pen-input characters and graphics to the image regenerated and displayed by the monitor 44A (painting process), or for use in pen-inputting a file name.

When the touch panel 44B is used, it is necessary to set the mode of the electronic camera 10 in a dedicated mode, and the mode of the electronic camera 10 is set in a "paint mode". Using the touch panel 44B, it is possible to pen-input a character and graphics to the image regenerated and displayed on the monitor 44A. By setting the mode of the electronic camera 10 in the "file change mode", a pen-input file name is input and changed using the touch panel 44B to the image regenerated and displayed to the monitor 44A. The operation of the electronic camera 10 for each mode is explained.

Figure 4:
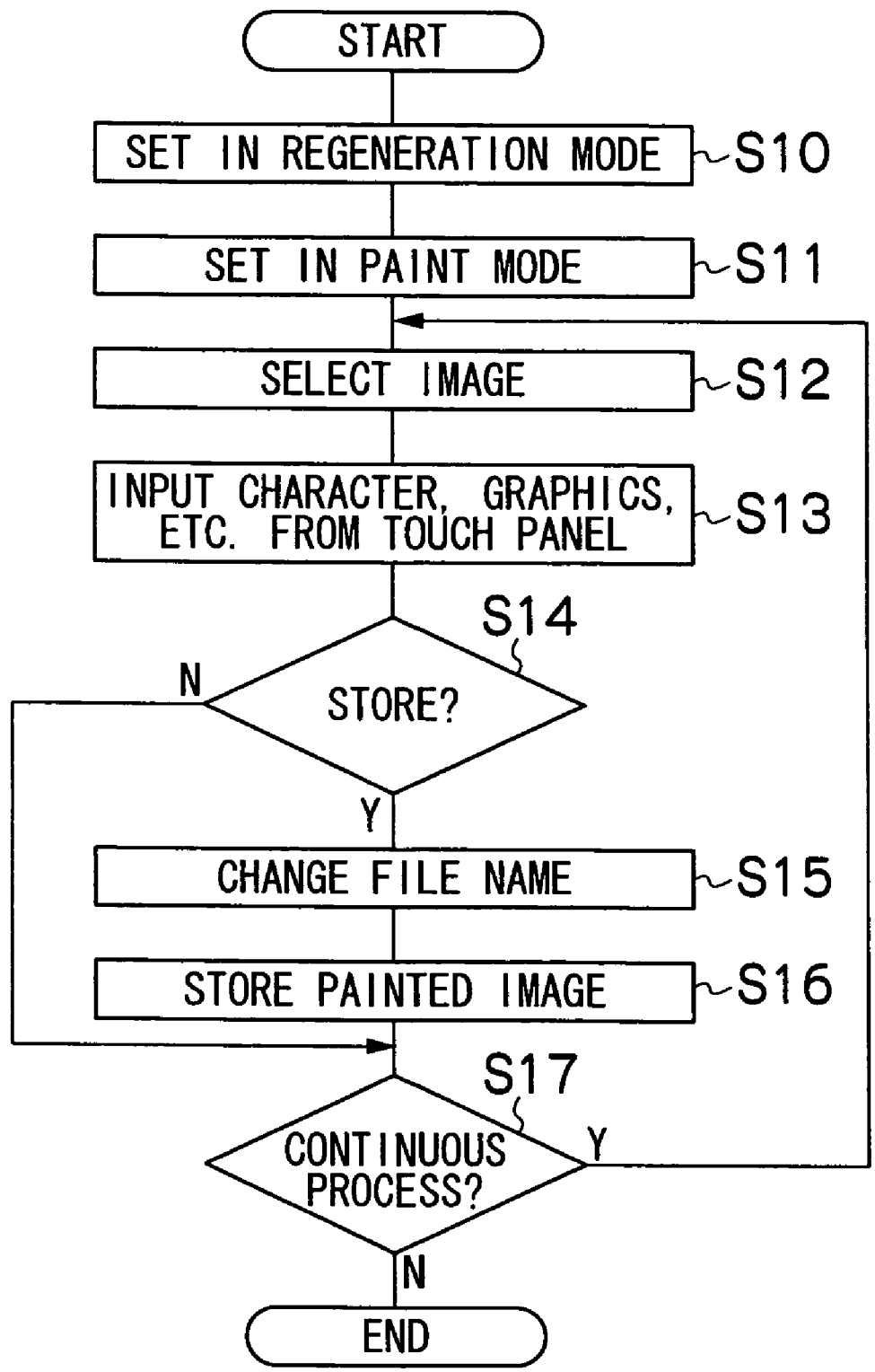
FIG. 4 is a flowchart of the operation procedure of an electronic camera in a paint mode.

The operation of the electronic camera 10 in the "paint mode" is explained according to the flowchart shown in FIG. 4.

As described above, the "paint mode" is a mode in which a pen-input character and graphics are added to the image regenerated and displayed on the monitor 44A.

The "paint mode" is performed in the regeneration menu. First, the mode of a camera is set in the regeneration mode (step S10). The regeneration mode is set by the power supply switch 28, and the power supply switch 28 is slid to the regeneration position into the regeneration mode of the camera. When the regeneration mode is set, the latest recorded image in the memory card is regenerated and displayed on the monitor 44A.

When the menu/OK button 38 is pressed in the regeneration mode, the display of the monitor 44A is switched, and the regeneration menu is displayed on the monitor 44A as shown in FIG. 5A. The user selects the item "paint" from the regeneration menu displayed on the monitor 44A. Thus, the mode of the camera changes into the paint mode (step S11). The menu item selecting operation is performed by moving the cursor by the cross button 42, and the menu/OK button 38 determines the selection.

When the camera mode is set in the paint mode, the display of the monitor 44A is switched, and the image displayed on the monitor 44A is regenerated and displayed again to the monitor 44A before displaying the regeneration menu as shown in FIG. 5B. The user advances a frame of an image, and regenerates and displays an object to be painted on the monitor 44A (step S12). An image is advanced by the cross button 42. When the right key of the cross button 42 is pressed the image is advanced by one frame. When the left key is pressed, the image is returned by one frame.

When the image to be processed is regenerated and displayed on the monitor 44A, the menu/OK button 38 is pressed. Thus, an image to be processed is selected and determined. After the determination, the painting process can be performed, and the user writes any character and graphics on the monitor 44A using the pen 50. The written character and graphics (locus data of the pen 50) are detected by the touch panel 44B laid on the monitor 44A, and added to the image processing unit 56 through the system control unit 52. The image processing unit 56 combines the written characters and graphics (locus data of the pen 50) with the image being regenerated. The composite image is displayed on the monitor 44A through the display processing unit 60 as shown in FIG. 5C. Thus, characters and graphics are written to the images being regenerated. When the writing is completed, the menu/OK button 38 is pressed. Thus, the painting process terminates.

When the painting process is terminated, a message asking the necessity to store a painted image ("to be stored?") is displayed on the monitor 44A as shown in FIG. 5D. According to the message, the user presses the menu/OK button 38 when a painted image is stored, and the BACK button 40 is pressed when the image is not stored. The system control unit 52 detects the press of the menu/OK button 38 or the BACK button 40, and determines the necessity to store a painted image (step S14). If it is to be stored, the file name of a painted image is changed (step S15), and stored in the memory card (step S16). That is, the file name is changed and stored such that such that the image file can be recognized as a painted image based on the file name. The file name is changed into the file name by adding a predetermined identification symbol to an original file name ("W" refers to "WRITING"). Therefore, for display, if an image having the file name "DSCF0001.JPG" is painted, and the painted image is stored, then the file name is changed into "DSCF0001W.JPG".

If a painted image is stored, the display of the monitor 44A is switched, and a message ("Is the process to be continuously performed?") asking whether or not a painting process is continuously performed is displayed on the monitor 44A as shown in 5E. When the user continuously performs the painting process according to the message, the menu/OK button 38 is processed. When the process is to be stopped, the BACK button 40 is pressed. The system control unit 52 detects the press of the menu/OK button 38 or the BACK button 40, determines the necessity to perform the continuous process (step S17). If the continuous process is not performed, then the painting process terminates. Thus, the normal regeneration mode is restored. On the other hand, when the process is continued, control is returned to S12, and the image is selected.

As explained above, by setting the camera mode in the "paint mode", a pen-input character and graphics can be added to the image regenerated and displayed on the monitor 44A using the touch panel 44B arranged on the monitor. Furthermore, in the painted image, "W" is added to the file name. Therefore, a painted image can be immediately recognized by the file name, thereby easily managing the subsequent data management.

In the present embodiment, a painted image is separately stored (by a different name), but an image before the painting process can be replaced with a painted image and can be stored (overwriting). Overwriting and storage by different name can be selected.

Figure 6:
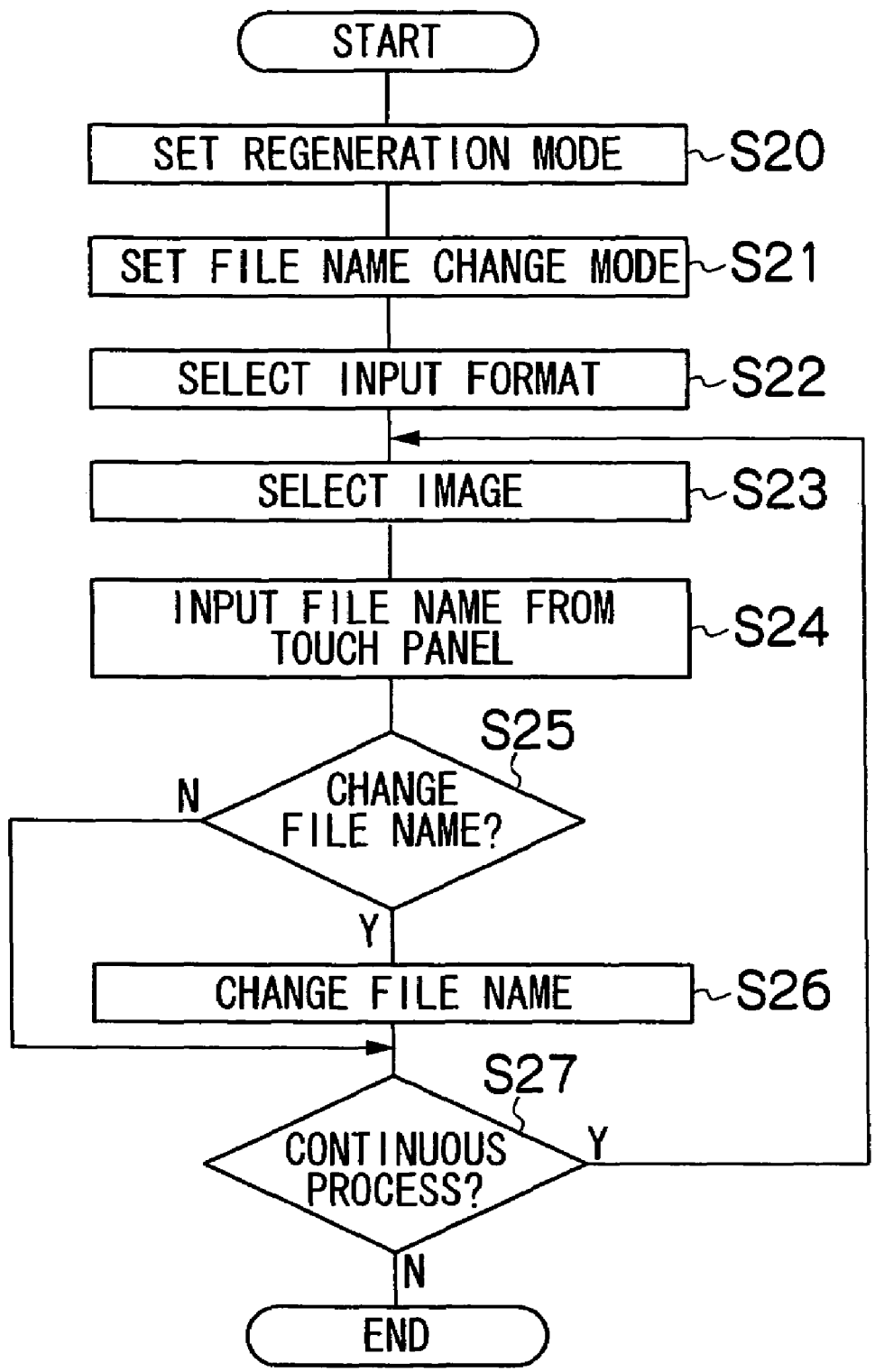
FIG. 6 is a flowchart of the operation procedure of an electronic camera in a file name change mode.

The operation of the electronic camera 10 in the "file name change mode" is explained by referring to the flowchart shown in FIG. 6.

As described above, the "file name change mode" is a mode in which the file name of the image regenerated and displayed on the monitor 44A is pen-input using the touch panel 44B.

Figure 7A:
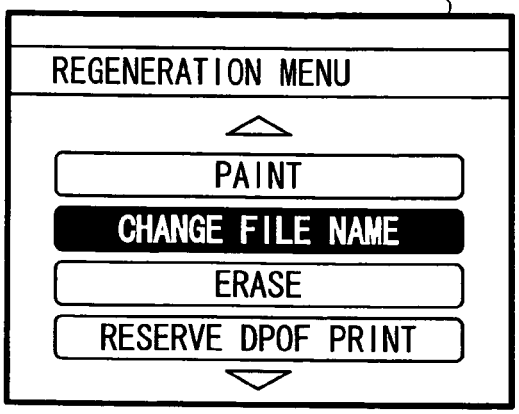
FIGS. 7A to 7F show examples of displaying a monitor in a file name change mode.

Setting the "file name change mode" is performed from the regeneration menu as in the above-mentioned "paint mode". First, after setting the camera mode in the regeneration mode (step S20), the menu/OK button 38 is pressed, and, as shown in FIG. 7A, the regeneration menu is called to the monitor 44A. Then, the item of "file name change" is selected from the regeneration menu. Thus, the camera mode changes into the file name change mode (step S21).

Figure 7B:
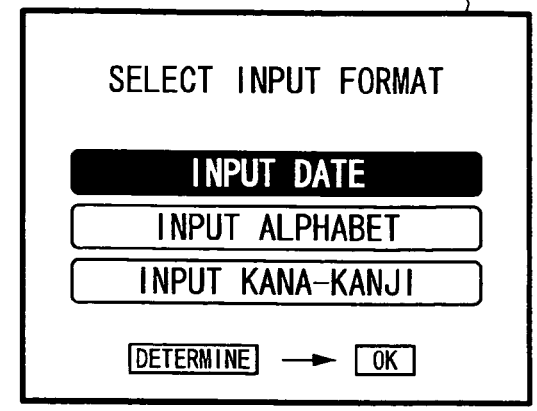

When the camera mode is set in the file name change mode, the display of the monitor 44A is switched, and the selection screen of the input format is displayed as shown in FIG. 7B.

Assuming that there are three input formats to be selected, that is, the "date input" in which a file name is input by date, the "alphabetic input" in which a file name is input by alphabetic character, and "kana-kanji input" in which a file name is input by kana/kanji, the user selects one of the three input formats (step S22). The "date input" is selected. The selection is performed by moving the cursor by the cross button 42, and the menu/OK button 38 confirms it.

Figure 7C:
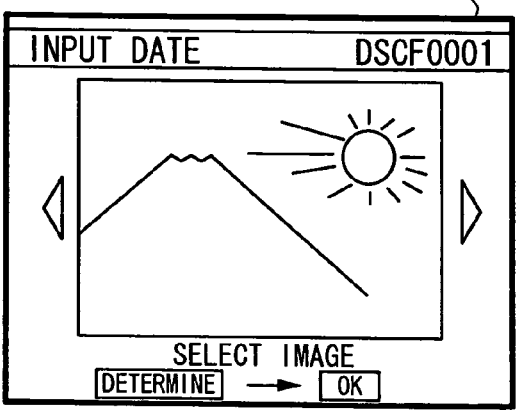

When an input format is selected, as shown in FIG. 7C, an image displayed on the monitor 44A before displaying the regeneration menu is displayed again on the 44A. The user advances the frames, and regenerates and displays the image whose file name is changed on the monitor 44A (step S23). The images are advanced using the right and left keys of the cross button 42 as in the "paint mode". In this case, for example, the image having the file name "DCSF001.JPG" is selected.

The user presses the menu/OK button 38 when the image to be processed is regenerated and displayed on the monitor 44A. Thus, the selection of the image to be processed is determined.

Figure 7D:
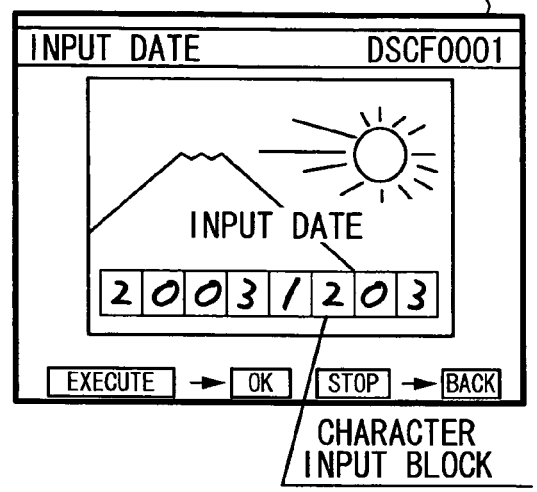

When the selection of an image is determined, eight boxes of character input block for input of a file name is displayed by a file name overlapping the selected image as shown in FIG. 7D. Simultaneously, a message prompting a file name (in this example, "Enter the date.") is displayed. The user inputs the data (pen-input character) in the character input block based on the message using a pen 50 (step S24). In this example, assume that Dec. 3, 2003 is input, and "20031203" is input in the character input block.

The input character (locus data of the pen 50) is detected on the touch panel 44B laid on the monitor 44A, and added to the image processing unit 56 through the system control unit 52. The image processing unit 56 combines the written character (locus data of the 50) with the image being regenerated, and the composite image is displayed on the monitor 44A through the display processing unit 60 as shown in FIG. 7D. Thus, the file name of the image being regenerated is input as pen-input characters, then the menu/OK button 38 is pressed, thereby terminating the input process.

When the character inputting operation terminates, the image processing unit 56 recognizes the character input in each character input block. The character recognition is performed by pattern matching with character data stored in the ROM.

Figure 7E:
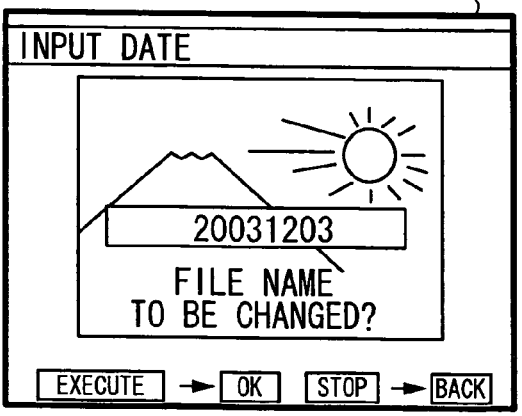

As shown in FIG. 7E, the recognized character string, that is, the date ("20031203") in this example is displayed on the monitor 44A. Simultaneously, a message ("File name is to be changed?") asking whether or not a change is made to the input file name is displayed on the monitor 44A. If the file name is to be changed based on the message, the menu/OK button 38 is pressed. If it is not changed, the BACK button 40 is pressed.

The system control unit 52 detects the press of the menu/OK button 38 or the BACK button 40, determines the necessity to store a painted image (step S25). When it is changed, the file name of the image being regenerated is rewritten on the monitor 44A and stored (step S26). In the present embodiment, the file name "DSCF0001.JPG" is rewritten to the file name "20031203" and is stored.

Figure 7F:
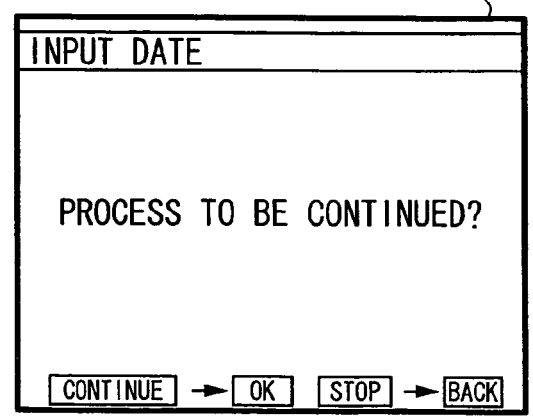

When the file name is rewritten and stored, the display of the monitor 44A is switched, and as shown in FIG. 7F, a message ("Process to be continued?") asking whether or not the file name change process is continued is displayed on the monitor 44A. If a user continuously changes a file name according to the message, the menu/OK button 38 is pressed. When the changing process is stopped, the BACK button 40 is pressed. The system control unit 52 detects a press of the menu/OK button 38 or the BACK button 40, and determines the necessity of the continuous process (step S27). If the continuous process is not performed, the file name change process is terminated. Thus, a normal regeneration mode is restored. On the other hand, when the process is continued, control is returned to step S23, and an image is selected.

As explained above, by setting the camera mode to the "file name change mode", the file name can be manually rewritten using the touch panel 44B. Thus, the file name rewriting operation can be easily performed, and the management of an image recorded on a memory card can be much easier.

In the example above, the input format of the file name is "date input". However, by selecting the "alphabetic input" in step S22, a file name can be input by alphabetic characters, and by selecting "kana-kanji input", a file name can be input by kana and kanji. In this case, an alphabetic character or kana-kanji is input to a character input block displayed on the monitor 44A, and the character input in the character input block is recognized by the system control unit 52. In this case, all characters can be recognized regardless of the input format, but by setting different input formats as in the present embodiment, character recognition can be more easily performed, and an input character can be recognized without error.

In the present embodiment, the character data for use in character recognition is stored in the ROM in the system control unit 52, but it can be stored in a memory card attached to and removable from the electronic camera 10. Thus, it is not necessary to store character data in the ROM, thereby reducing the requirements of the memory capacity. By switching a memory card, the variation of recognized character types can be increased or changed. In this case, it is desired that an electronic camera has a plurality of memory card slots for insertion of a memory card in the camera body 12. Thus, a memory card inserted into a memory card slot stores data of captured image, and a memory card storing character data can be inserted into another memory card slot.

In the present embodiment, a painting process and a file name change process are performed on a recorded image, but a painting process and a file name change process can be performed on a captured image. That is, a captured image is preview-displayed on the monitor 44A, and the painting process and the file name manually inputting process can be performed on the preview-displayed image.

Figure 8:
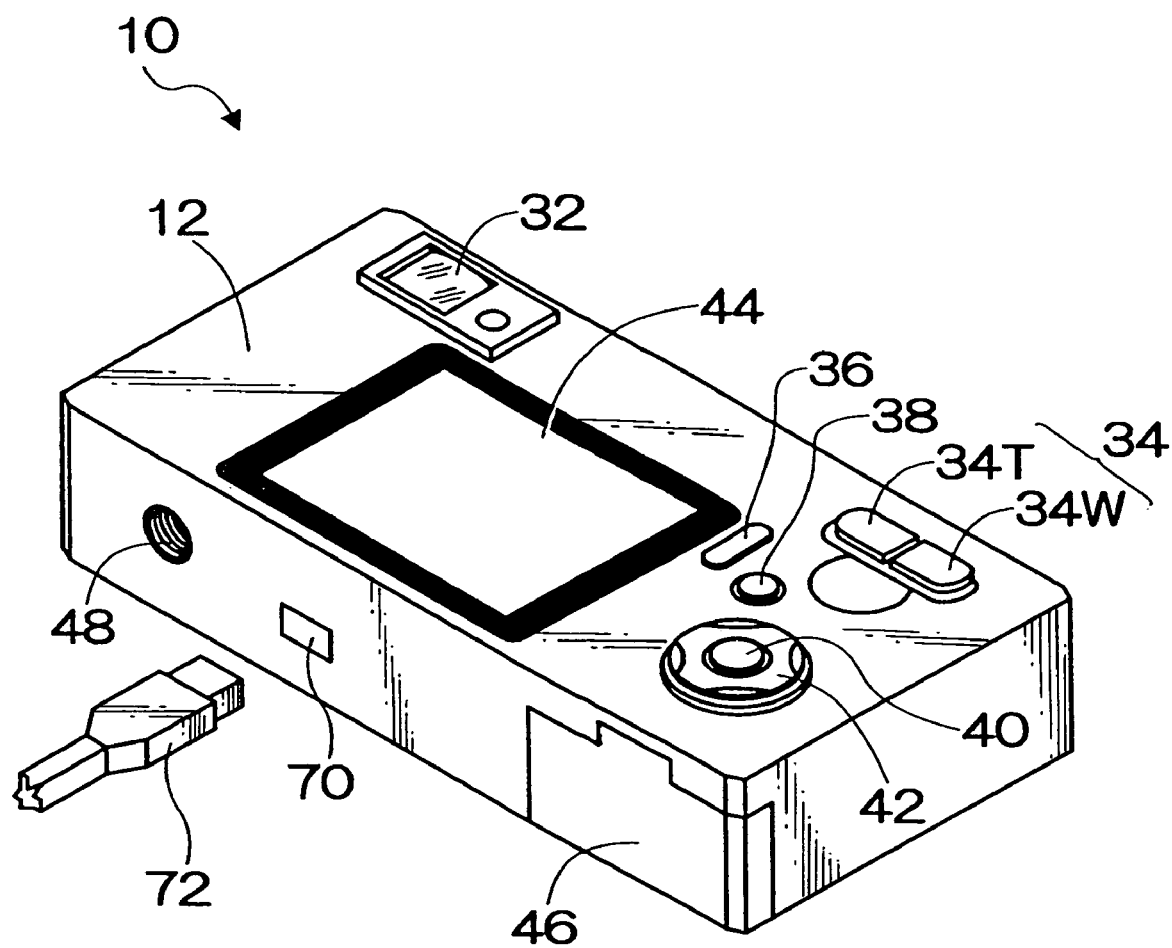
FIG. 8 is a rear perspective view showing another embodiment of the electronic camera.

In the present embodiment, a character can be input using a touch panel, but an input device for a character, etc. is not limited to this. For example, as shown in FIG. 8, a USB terminal 70 is provided for the camera body 12, and the USB terminal 70 can connect to a mouse, a keyboard, etc. through a USB cable 72 so that a character, etc. can be input through these external equipment.

Furthermore, according to the present embodiment, a pen-input character from a touch panel can be combined with an image displayed on the monitor 44A, but a pen-input character from the touch panel can be character-recognized into a prescribed character, and a converted character can be combined with an image displayed on the monitor 44A. In this case, it is desired that the type of character recognized character can be selected. Thus, a pen-input character can be quickly and correctly recognized.

In the present embodiment, a character, etc. input from the touch panel in the paint mode is combined with the image displayed on the monitor 44A, but can be combined with an image input from a memory card and external equipment (for example, a digital camera, a PC, data storage, etc.).

Figure 9:
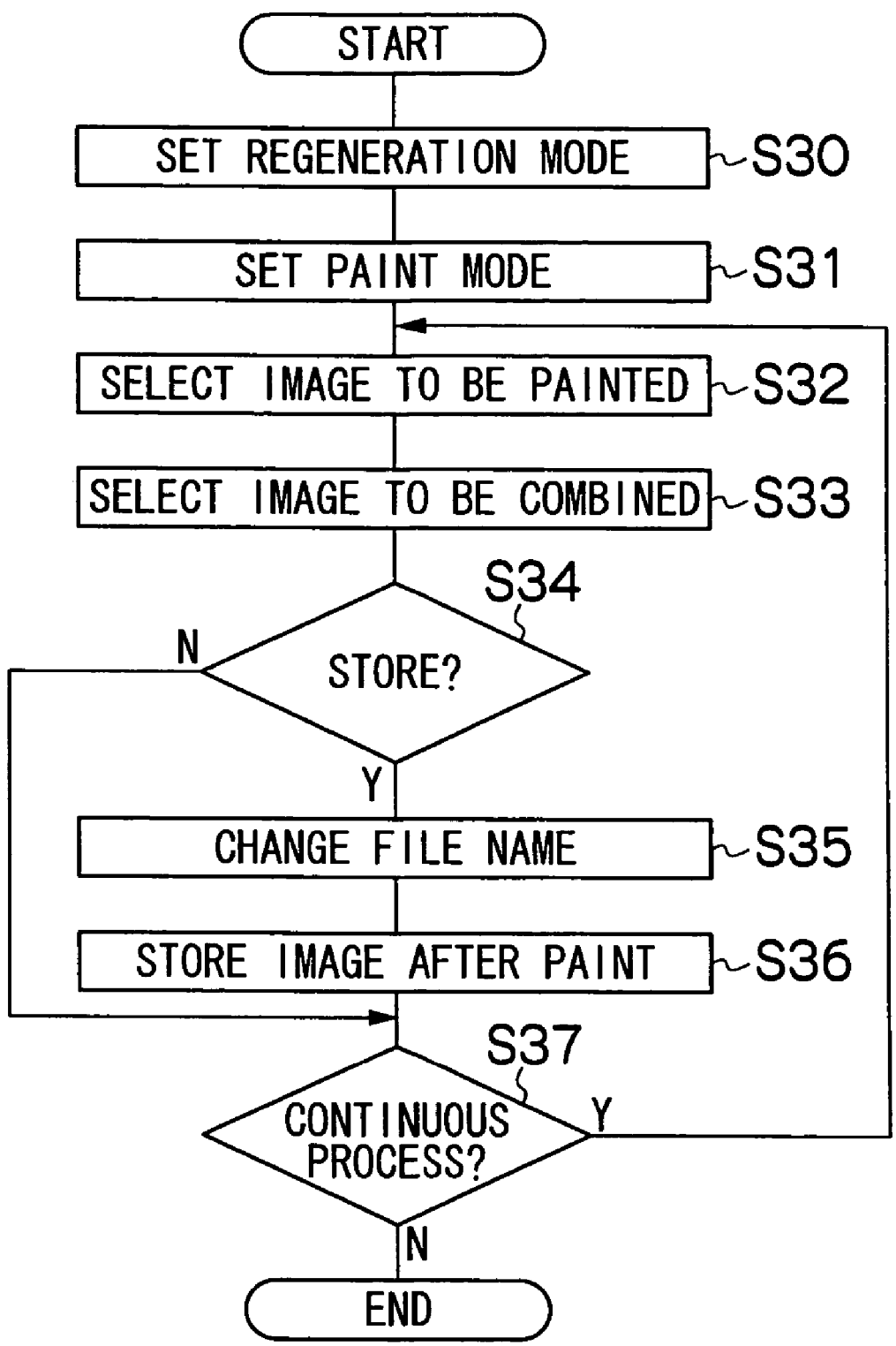
FIG. 9 is a flowchart showing the procedure used when an image input from a memory card and external equipment is composed.

The procedure of combining an image input from a memory card and external equipment with an image displayed on the monitor is explained by referring to the flowchart shown in FIG. 9.

Figure 10A:
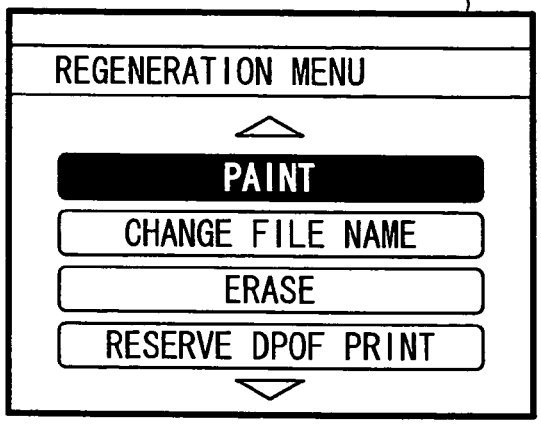
FIGS. 10A to 10E show examples of displaying a monitor when an image is composed.

First, the camera mode is set to a regeneration mode (step S30). In the regeneration mode, as shown in FIG. 10A, the regeneration menu is called to the monitor 44A and the item "paint" is selected. Thus, the camera mode is transferred to the paint mode (step S31).

Figure 10B:
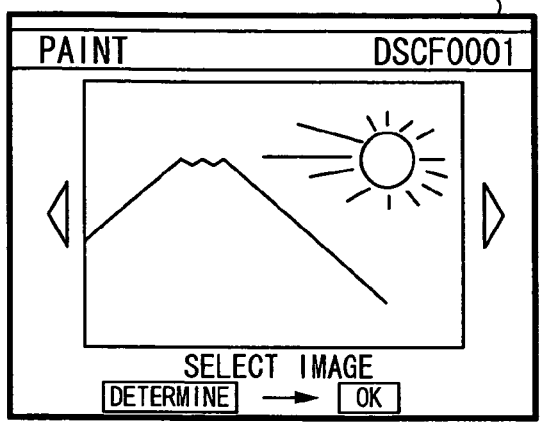

When the camera mode is set in the paint mode, the display of the monitor 44A is switched, and an image is regenerated and displayed on the monitor 44A as shown in FIG. 10B. The user advances a frame, selects a target to be painted (step S32), presses the menu/OK button 38, and determines the selection.

Figure 10C:
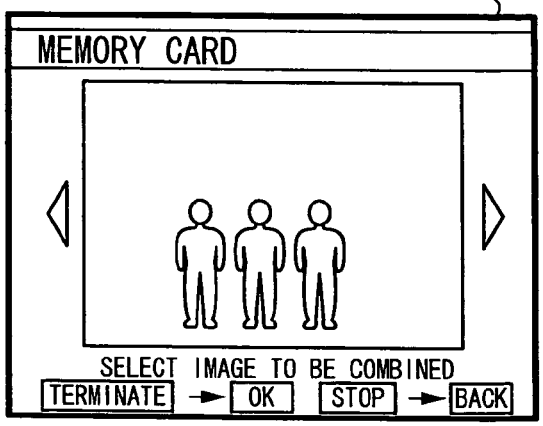

When the image to be processed is selected, the display of the monitor 44A is switched as shown in FIG. 10C, and the combined image is regenerated and displayed on the monitor 44A.

The image displayed on the monitor 44A is an image recorded on the memory card, and a user advances a frame to select a combined image (step S32). A frame is advanced by the left and right key operations of the cross button 42, the menu/OK button 38 is pressed, and the selection is determined.

Figure 10D:
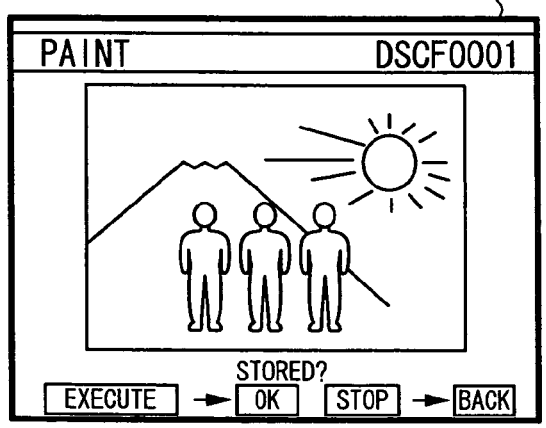

When an image to be combined is determined, the selected image is added to the image processing unit 56. The image processing unit 56 combines the selected image with the image regenerated on the monitor 44A. The composite image, as shown in FIG. 10D, is displayed on the monitor 44A through the display processing unit 60. Simultaneously, a message ("to be stored?") asking the necessity to store the composite image is displayed on the monitor 44A. A user sees the composite image displayed on the monitor 44A and determines the necessity to store the image. When the composite image is stored, the menu/OK button 38 is pressed. If it is not stored, the BACK button 40 is pressed.

The system control unit 52 detects the press of the menu/OK button 38 or the BACK button 40, determines the necessity to store a painted image (step S34). If it is stored, the file name of the painted image is changed (step S35), and stored in the memory card (step S36). That is, the file name is changed and stored so that the painted (composed) image file can be recognized from the file name. Furthermore, in the present embodiment, the file name is changed and stored so that the input source of the composite image can be determined from the file name.

Assume that the file name is changed into a file name obtained by adding a character for identification of a composite image and a character for identification of an input source of a composite image to an original file name. For example, "W" is added as a character indicating a composite image. As an input source of a composite image, "M" is added for a memory card, and "U" is added for external equipment connected through the USB terminal 70.

Therefore, for example, when an image input from a memory card is combined with the image having the file name of "DSCF0001.JPG", and when a composite image is stored, the file name is changed into "DSCF0001MW.JPG".

Figure 10E:
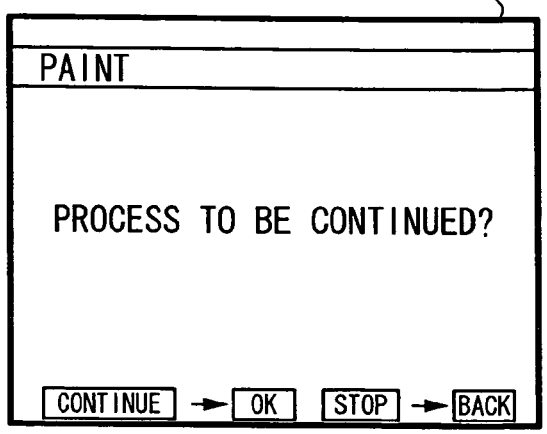

When a composite image is stored, the display of the monitor 44A is switched, and a message ("process to be continued?") asking whether or not a painting process is to be continuously performed is displayed on the monitor 44A as shown in FIG. 10E. In response to the message, the user presses the menu/OK button 38 when the painting process is to be continuously performed, and presses the BACK button 40 when the process is stopped.

The system control unit 52 detects the press of the menu/OK button 38 or the BACK button 40, determines the necessity of the continuous process (step S37), and when a continuous process is not to be performed, the painting process terminates. Thus, control is returned to the normal regeneration mode. On the other hand, when the process is to be continued, control is returned to S32, and an image is selected.

As explained above, when an image is composed, an image obtained from a memory card or external equipment can be combined.

In the example above, combined images are stored in the same memory card. However, it is not necessary to store them in the same memory card, and an image stored in another memory card can be used, or an image can be stored in the memory built in the electronic camera 10. When an image stored in another memory is used, it is desired that a plurality of memory card slots are provided for the electronic camera 10. Thus, a plurality of memory cards are simultaneously used to perform the composing process.

In the example above, a file name obtained by adding a character for identification of a composite image and a character for identification of an input source of a composite image to an original file name as a file name of a composite image is generated. However, a file name can also be generated by adding only a character for identification of a composite image to an original file name or adding only a character for identification of an input source of a composite image to an original file name.

In the example above, an example in which an image stored in a memory card, etc. is combined to an image regenerated and displayed on the monitor 44A, but not only an image, but also a template of a character or graphics, etc. stored in a memory card, etc. can be combined. That is, a template of a character and graphics, etc. to be combined is stored in a memory card, and the template of the character and graphics stored in the memory card is read and combined into an image. For example, when an image to be combined is selected in step S32, the display of the monitor 44A is switched, and a template which can be combined to the monitor 44A is displayed as shown in FIG. 11C. The template is configured such that frames can be advanced by a user operating the left and right keys of the cross button 42, and a desired template can be selected. Thus, not only an image, but also a template of a character and graphics stored in a memory card, etc. can be combined.

When a template of an image, a character, graphics, etc. is combined, it is desired that a combination position can be adjusted. In this case, for example, after determining an image, etc. to be combined, a combination position is adjusted by a key operation of the cross button 42.

Furthermore, according to the present embodiment, in a file name change mode, a file name is input through character recognition of a character input from a touch panel, but prescribed character data can be stored in ROM, a memory card, external equipment, etc. (for example, a data storage, etc.) which is USB connected, and the character data can be selected and input. For example, character data such as a numeric, alphabetic, and kana-kanji characters, etc. and further a date, the name of a person, a name of an area, etc. can be stored in ROM, etc. from which available character data can be selected. The selection can be performed. That is, first, a character type is selected as shown in FIG. 12A. The selection can be performed by moving a cursor by the operation of the cross button 42, pressing the menu/OK button 38, and determining the selection. For example, when a numeric is selected as a character type to be input, a numeric selection screen is displayed on the monitor 44A as shown in FIG. 12B. When an alphabet is selected, an alphabet selection screen is displayed on the monitor 44A as shown in FIG. 12C. When an area name is selected, an area name selection screen is displayed on the monitor 44A. On the area name selection screen, a metropolis/prefecture and a city/town/village can be selected. The name of a metropolis/prefecture and the name of a city/town/village displayed in each column is input by scroll using up and down key operation of the cross button 42 (the name of a city/town/village can be selected from among the city/town/village existing in the selected metropolis/prefecture selected by the name of the metropolis/prefecture).

As described above, prescribed character data is stored in ROM, a memory card, or external equipment, and the character data can be selected and input. When character data is stored in a memory card, the memory card is exchanged as necessary, thereby changing and increasing available character data.

In the above-mentioned series of embodiments, as explained above by referring to the case in which the present invention is applied to an electronic camera, but the application of the present invention is not limited to an electronic camera, but can be applied to any electronic equipment (image pick-up apparatus) having the function of capturing an image such as a digital video camera, a mobile phone with a camera, etc.

What is claimed is:

1. An image pick-up apparatus with a monitor for displaying a captured image, comprising:
    an input device which inputs a character and/or an image to be combined with an image displayed on the monitor;
    a touch panel which is mounted on a screen of the monitor, and is capable of accepting a pen-input character and image;
    a mode set device which sets a mode of the apparatus into paint mode or file name change mode;
    a composition device which combines the character and/or the image input through the input device in the paint mode, or the pen-input character and the image from the touch panel, with the image displayed on the monitor, and generates a composite image;
    a record instruction device which instructs a record of the composite image generated by the composition device in the paint mode;
    a record control device which records a composite image generated by the composition device in accordance with an instruction of the record instruction device in the paint mode in a recording medium, the record control device adding an identification symbol for identifying that the image recorded in the recording medium is a composite image and an identification symbol for identification of an input source of the character and/or image which is combined with the composite image, to a part of a file name of the composite image when the composite image is recorded in the recording medium;
    a file name change instruction device which instructs a change of a file name of an image displayed on the monitor in the file name change mode;
    a character data storage device which stores prescribed character data;
    a character recognition device which recognizes a pen-input character from the touch panel in the file name change mode based on character data stored in the character data storage device; and
    a file name rewrite device which rewrites a file name of an image displayed on the monitor into a file name input by the touch panel in accordance with an instruction of the file name change instruction device in the file name change mode.

2. The image pick-up apparatus according to claim 1, wherein
    the composition device combines a character of character data recognized by the character recognition device with an image displayed on the monitor.

3. The image pick-up apparatus according to claim 1, wherein
    prescribed character data stored in the character data storage device is numeric character data.

4. The image pick-up apparatus according to claim 1, wherein
    prescribed character data stored in the character data storage device is alphabetic character data.

5. The image pick-up apparatus according to claim 1, wherein
    prescribed character data stored in the character data storage device is kana-kanji character data.

6. The image pick-up apparatus according to claim 1, wherein:
    prescribed character data stored in the character data storage device is numeric, alphabetic, and kana-kanji character data; and
    the apparatus further comprises a character type selection device which selects a character type recognized by the character recognition device.

7. The image pick-up apparatus according to claim 1, wherein
    the character data storage device is attachable to and removable from the body of the apparatus.

* * * * *